April 24, 1951  J. JOHANSEN  2,549,908
APPARATUS FOR FEEDING AND WEIGHING
Filed July 12, 1947
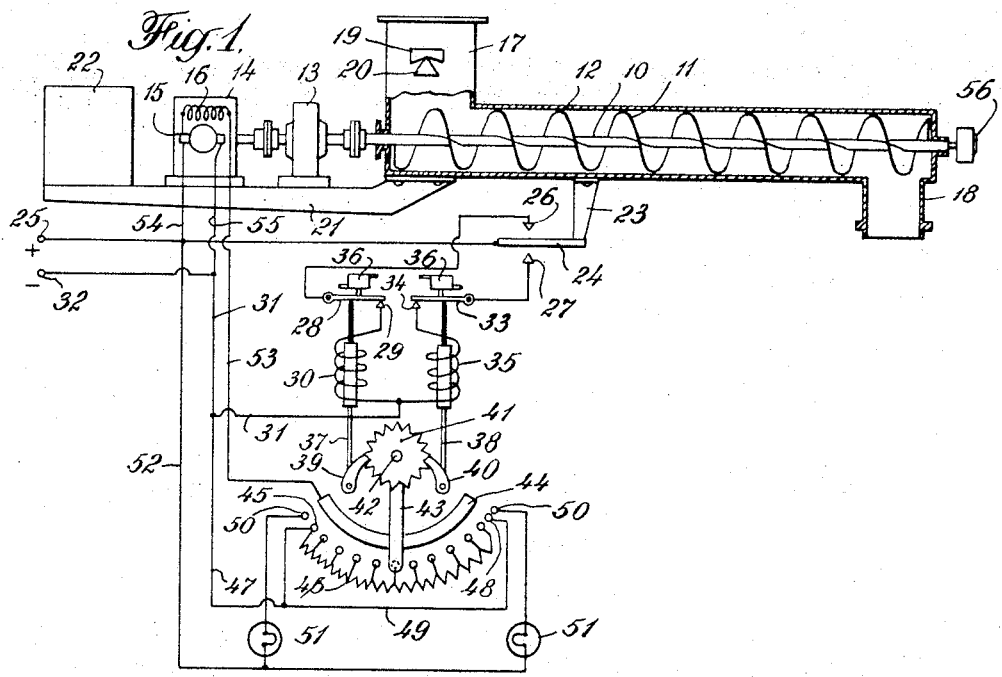
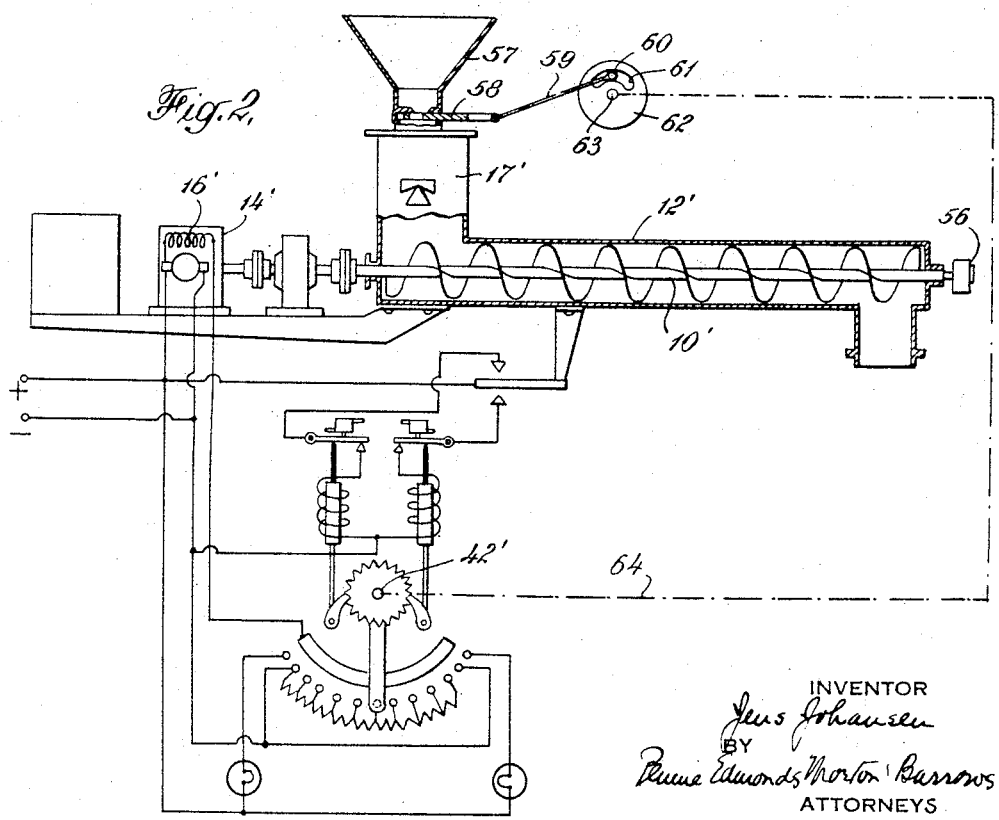
INVENTOR
Jens Johansen
BY
Pennie Edmonds Morton Barrows
ATTORNEYS Patented Apr. 24, 1951

2,549,908

UNITED STATES PATENT OFFICE 2,549,908

APPARATUS FOR FEEDING AND WEIGHING

Jens Johansen, Copenhagen, Denmark, assignor to F. L. Smidth & Co., New York, N. Y., a corporation of New Jersey Application July 12, 1947, Serial No. 760,586
In Denmark September 10, 1941

Section 1, Public Law 690, August 8, 1946
Patent expires September 10, 1961

6 Claims. (Cl. 198—37)

This invention relates to feeding and weighing pulverulent or granular materials and is concerned more particularly with a novel apparatus, by means of which such materials may be fed and the total amount of material handled can be readily determined.

In the new apparatus, the material is fed in the form of a stream, which is maintained at approximately constant weight per unit of length at all times, so that the total quantity of material fed can be determined by noting the length of the stream passing a given point. The material to be fed is preferably supplied to a conveyor, which is supported on a mounting, so that it is capable of swinging in one direction or the other from a normal position, as the weight of the body of material on the conveyor rises above or falls below a selected value. The conveyor is driven by suitable means capable of regulation and, as the conveyor swings on its mounting with a variation in the weight of the body of material upon it, the drive means varies the speed of the conveyor directly with variations in the weight of the body of material. As a consequence, the cross-section of the body of material varies inversely with its weight and the weight of the stream of material discharged from the conveyor is approximately constant per unit of length. The total quantity of material fed may then be determined by measuring the length of the stream as, for example, by counting the units of length, through which a point on the conveyor travels.

The new apparatus has been found to give results of excellent accuracy and affords numerous advantages over the apparatus heretofore employed. One such advantage is the possibility of continuous weighing of the material being fed, with the quantity of weighed material recorded as the operation proceeds. Also, the new apparatus is much simpler than that heretofore used for either intermittent or continuous operation.

The new apparatus may be employed in various applications as, for example, for the continuous measurement of the weight of a varying flow of material discharged from a grinding mill used in the cement industry. In each application, the range of variation of speed of the conveyor must be as great as the range of fluctuation in the weight of the material fed thereto.

In the preferred form of apparatus for practicing the method, the material to be weighed is delivered to a screw conveyor suspended like a balance. The worm of the conveyor is driven by a variable speed electric motor, the speed variation of which is obtained by varying the field. The conveyor is balanced for a selected weight of material therein, and, whenever the weight of the material in the conveyor departs from the selected value, the conveyor swings and this causes a variation in the speed of the motor. If, for example, the weight of the material in the conveyor increases, the motor is speeded up and the weight of the material between the flights of the screw is correspondingly decreased. Accordingly, an approximately constant weight of material is maintained in the conveyor at all times, and, by counting the number of revolutions of the screw, the total quantity of material discharged by the conveyor can be readily determined.

For a better understanding of the invention reference may be had to the accompanying drawing, in which Fig. 1 is a view in side elevation, with parts broken away, of an apparatus for practicing the new method, certain of the features being shown diagrammatically; and Fig. 2 is a view similar to Fig. 1, showing a modified construction.

The apparatus illustrated in Fig. 1, comprises a screw conveyor, which includes a shaft 10 with screw flights 11 thereon and a casing 12 enclosing the shaft. The shaft projects out of the casing at one end and is coupled through a gear reduction box 13 to the shaft of a motor 14, which has an armature 15 and a field winding 16, the armature and winding being shown diagrammatically. The casing has an inlet 17 and an outlet 18 and is mounted for swinging movement on a horizontal axis provided by projections 19 on the casing resting on knife edges 20 on suitable supports (not shown). The gear box and motor are mounted on a beam 21 attached to the casing and the beam also carries a counter-weight 22, which may be varied in size.

An arm 23 attached to the casing carries a contact blade 24 connected to one terminal 25 of a source of power and lying between fixed contacts 26, 27. Contact 26 is connected through a switch, comprising a movable blade 28 and a fixed contact 29, to one end of a solenoid 30, the other end of the solenoid being connected through a return line 31 to the other terminal 32 of the source of power. Contact 27 is connected through a switch, comprising a movable arm 33 and a fixed contact 34, to one end of a solenoid 35, the other end of which is connected to the return line 31. Each of the blades 28, 33 is provided with a delayed return device 36, which operates, after an interval, to move its blade against the associated fixed contact, when the blade has been moved away from the contact and then released.

The respective solenoids 30, 35 have plungers 37, 38, which operate pawls 39, 40 of a double ratchet wheel 41 on shaft 42, the shaft having an arm 43 which operates along a curved bar 44 in continuous contact therewith and also makes contact at its end with terminals 45 of a rheostat 46. One end terminal of the rheostat is connected by line 47 and return line 31 to terminal 32. At its other end, the rheostat is provided with a terminal 48 connected by a line 49 to line 47. The rheostat is also provided at its ends with terminals 50 connected through lamps 51 and line 52 to terminal 25. The bar 44 is connected by a line 53 to one end of the field winding 16, the other end of the winding being connected to one end of armature 15 and by line 54 to terminal 25. The other end of the armature is connected by line 55 to terminal 32.

The apparatus is provided with a device 56 for indicating and, if desired, recording the number of rotations of the conveyor shaft 10. This device may be mounted to be driven by the shaft at any convenient place, as, for example, by a portion of the shaft projecting out of the casing 12 at the discharge end thereof.

In the operation of the apparatus, material from a source, such as a grinding mill, is fed into the casing of the screw conveyor through inlet 17 and, when the weight of the material within the casing is that for which the conveyor is balanced, the screw runs at a uniform speed. Whenever the weight of the material delivered to the conveyor increases, the conveyor swings clockwise and causes blade 24 to engage terminal 27. As a result, current is supplied to solenoid 35 and its plunger 38 rises, so that pawl 40 advances its ratchet wheel by one tooth to turn shaft 42 counter-clockwise. When the plunger has thus risen, its upper end moves blade 33 away from fixed contact 34 and this causes the solenoid to be deenergized. The plunger then falls to permit the pawl 40 to pass behind the next tooth on its ratchet wheel and, after an interval, blade 33 is moved back by the restoring device 36 into contact with terminal 34.

The angular movement of shaft 42 causes arm 43 to move along the rheostat to insert more resistance in series with the motor winding 16, and the speed of the motor is thereupon increased. This increases the speed of rotation of the worm shaft, so that less material lies between the flights of the worm and the cross-section of the stream of material through the conveyor is thereby decreased. If the adjustment of the resistance in the field winding circuit does not produce an increased speed of the conveyor shaft sufficient to reduce the weight of the material in the conveyor to the desired extent, and the conveyor still remains down, blade 24 remains engaged with contact 27 and solenoid 35 is energized again upon the movement of the blade 33 into engagement with its contact 34 by return device 36. The second energization of the solenoid causes another angular movement of shaft 42 which, in turn, causes more resistance to be inserted in the motor winding circuit and an increase in speed of the motor and the conveyor shaft. The adjustments continue as described, until the conveyor comes into balance, but, if the unbalanced condition persists, until shaft 42 has been swung so that arm 43 makes contact with terminal 50, lamp 51 is illuminated and the operator is thereby warned that the limit of automatic regulation has been reached.

Whenever lighter material is fed to the conveyor, when the latter is in balanced condition, and the conveyor load is thereby lightened, the conveyor swings counter-clockwise and causes blade 24 to engage contact 26. This establishes a circuit through solenoid 30 and the plunger 37 is raised and pawl 39 operates its ratchet wheel to move shaft 42 one step in the clockwise direction. This movement of shaft 42 moves arm 43 to decrease the resistance in the field winding circuit and the motor slows down. As a result, the amount of material between the flights of the screw increases and the cross-section of the stream passing through the conveyor correspondingly increases.

In the use of the apparatus described, the speed at which the material is advanced by the conveyor varies directly with the weight of the material being conveyed. Also, the cross-section of the stream of material in the conveyor decreases with an increase in the weight of the material in the conveyor and the total weight of material in the conveyor is thus approximately constant at all times. The number of revolutions of the conveyor shaft is, therefore, a measure of the material fed and the indicating and recording device 56 gives an indication and a record, which may be readily translated into units of weight of material delivered.

The modified form of apparatus illustrated in Fig. 2 is similar to that shown in Fig. 1 in all respects, except that the material is supplied to the inlet 17' of the conveyor casing from a hopper 57 provided with a gate valve 58 at its lower end. The valve is connected by a link 59 to a pin 60 lying within a curved slot 61 in a disc 62 mounted for rotation on shaft 63. Shaft 63 is coupled by the connection 64, indicated diagrammatically, to shaft 42 to rotate therewith.

In the operation of the apparatus shown in Fig. 2, a variation in the weight of the material in the screw conveyor casing 12' causes shaft 42' to be moved angularly to increase or decrease the resistance in the circuit of the field winding 16' of motor 14' which drives the screw conveyor shaft 10'. Under ordinary conditions of operation, the gate valve 58 somewhat restricts the flow of material from hopper 57 into the inlet 17' of the conveyor casing. As the shaft 42 is moved angularly, shaft 63 is correspondingly moved, and, when shaft 42' approaches the end of its permissible angular movement in either direction, pin 60 is engaged by one or the other of the ends of slot 61 in disc 62 and the gate valve is moved either to increase or decrease the flow from the hopper to the casing inlet, as may be required. When the feed to the conveyor has thus been adjusted by valve 58, the apparatus functions as before with the speed of the conveyor varying directly with the weight of the material in the conveyor casing. If the variation in the weight of the material approaches an extreme in either direction, the valve 58 is again moved, as required, to increase or decrease the supply of the material to the casing.

I claim:

1. An apparatus for feeding pulverulent or granular material and measuring the weight of the material fed, which comprises a conveyor, means for supplying material to the conveyor, a mounting for the conveyor, on which the conveyor may swing in either direction from a normal position, as the weight of the body of material on the conveyor rises above or falls below a selected value, means for driving the conveyor, means operated by the movement of the conveyor from its normal position on its mounting for varying the action of the driving means to cause the speed of the conveyor to vary directly with the weight of the body of material thereon, and means for counting the units of length of the stream of material discharged from the conveyor.

2. An apparatus for feeding pulverulent or granular material and measuring the weight of the material fed, which comprises a conveyor, means for supplying material to the conveyor, a mounting for the conveyor, on which the conveyor may swing in either direction from a normal position, as the weight of the body of material on the conveyor rises above or falls below a selected value, means for driving the conveyor, means operated by the movement of the conveyor from its normal position on its mounting for varying the action of the driving means stepwise to cause the speed of the conveyor to vary stepwise and directly with the weight of the body of material thereon, and means for counting the units of length of the stream of material discharged from the conveyor.

3. An apparatus for feeding pulverulent or granular material and measuring the weight of the material fed, which comprises a conveyor, means for supply material to the conveyor, a mounting for the conveyor, on which the conveyor may swing in either direction from a normal position, as the weight of the body of material on the conveyor rises above or falls below a selected value, a motor for driving the conveyor, means operated by the movement of the conveyor from its normal position on its mounting and including ratchet means for varying the speed of the motor directly with the weight of the body of material on the conveyor, and means for counting the units of length of the stream of material discharged from the conveyor.

4. An apparatus for feeding pulverulent or granular material and measuring the weight of the material fed, which comprises a screw conveyor, means for supplying material to the conveyor, a mounting for the conveyor, on which the conveyor may swing in either direction from a normal position, as the weight of the body of material on the conveyor varies from a selected value, means for rotating the conveyor screw, means operated by the movement of the conveyor from its normal position on its mounting and acting on the rotating means for varying the speed of rotation of the conveyor screw directly with variations in the weight of the body of material on the conveyor, and means for counting the rotations of the conveyor screw.

5. An apparatus for feeding pulverulent or granular material and measuring the weight of the material fed, which comprises a conveyor, means for supplying material to the conveyor, means for regulating the volume of the material supplied, a mounting for the conveyor, on which the conveyor may swing in either direction from a normal position, as the weight of the body of material on the conveyor varies from a selected value, means for driving the conveyor, means operated by the movement of the conveyor from its normal position and acting on the driving and regulating means to vary the speed of the conveyor stepwise and directly with variations in the weight of the body of material on the conveyor and to vary the volume of material supplied inversely with variations in the weight of said body of material, the variation in the volume supplied being effected only after a substantial variation in the conveyor, and means for counting the units of length of the stream of material discharged from the conveyor.

6. An apparatus for feeding pulverulent or granular material and measuring the weight of the material fed, which comprises a conveyor, means for supplying material to the conveyor, a mounting for the conveyor, on which the conveyor may swing in either direction from a normal position, as the weight of the body of material on the conveyor rises above or falls below a selected value, a motor for driving the conveyor, a ratchet means for varying the speed of the conveyor, a pair of solenoids for operating the ratchet means to increase and decrease the motor speed, means operated by movement of the conveyor in either direction from its normal position on the mounting for energizing one or the other of the solenoids to cause the motor speed to vary directly with variations in the weight of the body of material on the conveyor, and means for counting the units of length of the stream of material discharged from the conveyor.

JENS JOHANSEN.

REFERENCES CITED

The following references are of record in the file of this patent:

UNITED STATES PATENTS

| Number | Name | Date |
|---|---|---|
| 1,398,790 | Ogur | Nov. 29, 1921 |
| 1,777,670 | Hausman | Oct. 7, 1930 |
| 2,047,203 | Henson | July 14, 1936 |
| 2,083,391 | Murray | June 8, 1937 |
| 2,289,186 | Flint | July 7, 1942 |

FOREIGN PATENTS

| Number | Country | Date |
|---|---|---|
| 611,824 | Germany | Apr. 6, 1935 |